US008525822B2

(12) United States Patent
Liu et al.

(10) Patent No.: US 8,525,822 B2
(45) Date of Patent: Sep. 3, 2013

(54) LCD PANEL DRIVING CIRCUIT HAVING TRANSITION SLOPE ADJUSTING MEANS AND ASSOCIATED CONTROL METHOD

(75) Inventors: Chi Kang Liu, Hsinchu Hsien (TW); Chin-Wei Lin, Hsinchu Hsien (TW); Min-Nan Hsieh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 477 days.

(21) Appl. No.: 12/769,901

(22) Filed: Apr. 29, 2010

(65) Prior Publication Data

US 2010/0277458 A1 Nov. 4, 2010

(30) Foreign Application Priority Data

Apr. 30, 2009 (TW) ................................ 98114456 A

(51) Int. Cl.
*G06F 3/038* (2006.01)
*G09G 5/00* (2006.01)

(52) U.S. Cl.
USPC ............................................ 345/211; 345/98

(58) Field of Classification Search
USPC .................................................. 345/98, 211
See application file for complete search history.

(56) References Cited

U.S. PATENT DOCUMENTS

| | | | | |
|---|---|---|---|---|
| 6,211,849 | B1 * | 4/2001 | Sasaki et al. | 345/55 |
| 7,075,339 | B2 * | 7/2006 | Kajimoto | 327/87 |
| 2002/0011999 | A1 * | 1/2002 | Kim | 345/204 |
| 2003/0112039 | A1 * | 6/2003 | Rankin et al. | 327/108 |
| 2005/0168429 | A1 * | 8/2005 | Chou | 345/100 |
| 2006/0187159 | A1 * | 8/2006 | Nakano et al. | 345/87 |
| 2007/0008009 | A1 * | 1/2007 | Son et al. | 326/87 |
| 2008/0094328 | A1 * | 4/2008 | Ishiyama | 345/87 |
| 2009/0274241 | A1 * | 11/2009 | Tsao et al. | 375/295 |
| 2010/0045587 | A1 * | 2/2010 | Tu et al. | 345/99 |

FOREIGN PATENT DOCUMENTS

| | | |
|---|---|---|
| CN | 1584968 | 2/2005 |
| CN | 101340146 | 1/2011 |

* cited by examiner

*Primary Examiner* — Kwang-Su Yang

(74) *Attorney, Agent, or Firm* — Edell, Shapiro & Finnan, LLC

(57) ABSTRACT

A driving circuit on a liquid crystal display (LCD) panel and associated control method is provided. The LCD panel connected to a display control circuit via a flexible print circuit (FPC) includes a master source driver, for inputting a digital image signal in compliance with a first electrical specification via an FPC board and converting the digital image signal to a gate driving signal and a slave source driving signal, which are in compliance with a second electrical specification; a gate driver, for receiving the gate driving signal in compliance with the second electrical specification; and a slave source driver, for receiving the slave source driving signal in compliance with the second electrical specification. The master source driver, the slave source driver and the gate driver drive a thin-film transistor (TFT) on the LCD panel.

10 Claims, 6 Drawing Sheets

LCD PANEL DRIVING CIRCUIT HAVING TRANSITION SLOPE ADJUSTING MEANS AND ASSOCIATED CONTROL METHOD

CROSS REFERENCE TO RELATED PATENT APPLICATION

This patent application is based on Taiwan, R.O.C. patent application No. 098114456 filed on Apr. 30, 2009.

FIELD OF THE INVENTION

The present invention relates to a driving circuit on a liquid crystal display (LCD) panel and associated control method, and more particularly, to a driving circuit with low swing voltage on an LCD panel.

BACKGROUND OF THE INVENTION

FIG. 1 shows a schematic diagram of a conventional LCD panel and a driving circuit thereof. Generally, an LCD panel 10 is divided into a display area 12 and a non-display area 14. The display area 12 comprises a thin-film transistor (TFT) array, and the non-display area 14 comprises a gate driver 20, a master source driver 40 and a slave source driver 60 for controlling transistors of the TFT array.

Taking an LCD panel with a resolution of 800*480 as an example, the gate driver 20 needs 480 lines connected to the TFT array to control each of the 480 rows, and therefore the gate driver 20 is also referred as a row driver. The master source driver 40 and the slave source driver 60 are referred as column drivers. Take a TFT array controlled by red (R), green (G) and blue (B) colors as an example. The master source driver 40 and the slave source driver 60 need 2400 (800*3) lines connected to the TFT array to control 800 columns. Hence, the master source driver 40 needs 1200 lines and the slave source driver 60 needs 1200 lines.

Conventionally, a display controller 82 on a circuit board 80 outside the LCD panel 10 outputs a first digital image signal and a second digital image signal to the master source driver 40 and the slave source driver 60 on the LCD panel 10 via two flexible print circuits (FPC) 42 and 44, respectively. The master source driver 40 generates a gate driver signal to the gate driver 20 according to the first digital image signal.

The first digital image signal and the second digital image signal outputted by the display controller 82 are of transistor-transistor logic (TTL) logic level or complementary metal-oxide semiconductor (CMOS) logic level. That is, the high level is 3.3 V and the low level is 0 V. Similarly, the gate driving signal outputted by the master source driver 40 is also of a TTL or CMOS logic level.

Cost and area of the FPCs 42 and 44 connected between the circuit board 80 and the LCD panel 10 are proportional to each other.

SUMMARY OF THE INVENTION

An object of the present invention is to provide a driving circuit on an LCD panel, with a signal transmitted between drivers of the LCD panel having a low swing voltage and slow transition speed.

The present invention provides an LCD panel connected to a display controller. The LCD panel comprises a main source driver for receiving a digital image signal in compliance with a first electrical specification from the display controller and converting the digital image signal to a gate driving signal and a slave source driving signal in compliance with a second electrical specification, a gate driver for receiving the gate driving signal in compliance with the second electrical specification, and a slave source driver for receiving the slave source driving signal in compliance with the second electrical specification. The main source driver, the slave source driver and the gate driver drive a TFT array on the LCD panel according to the digital image signal, the gate driving signal and the slave source driving signal.

The present invention further provides a method for transmitting an LCD driving signal with low electromagnetic interference (EMI). The method comprises receiving a digital image signal in compliance with a first electrical specification; generating a gate driving signal and a slave source driving signal in compliance with a second electrical specification according to the digital image data; and driving a TFT array on the LCD panel according to the digital image signal, the gate driving signal and the slave source driving signal, respectively.

The advantages and spirit of the present invention can be further understood with the following detailed description and drawings. However, the present invention is not limited to the following description and drawings.

DETAILED DESCRIPTION OF THE PREFERRED EMBODIMENT

Figure 1:
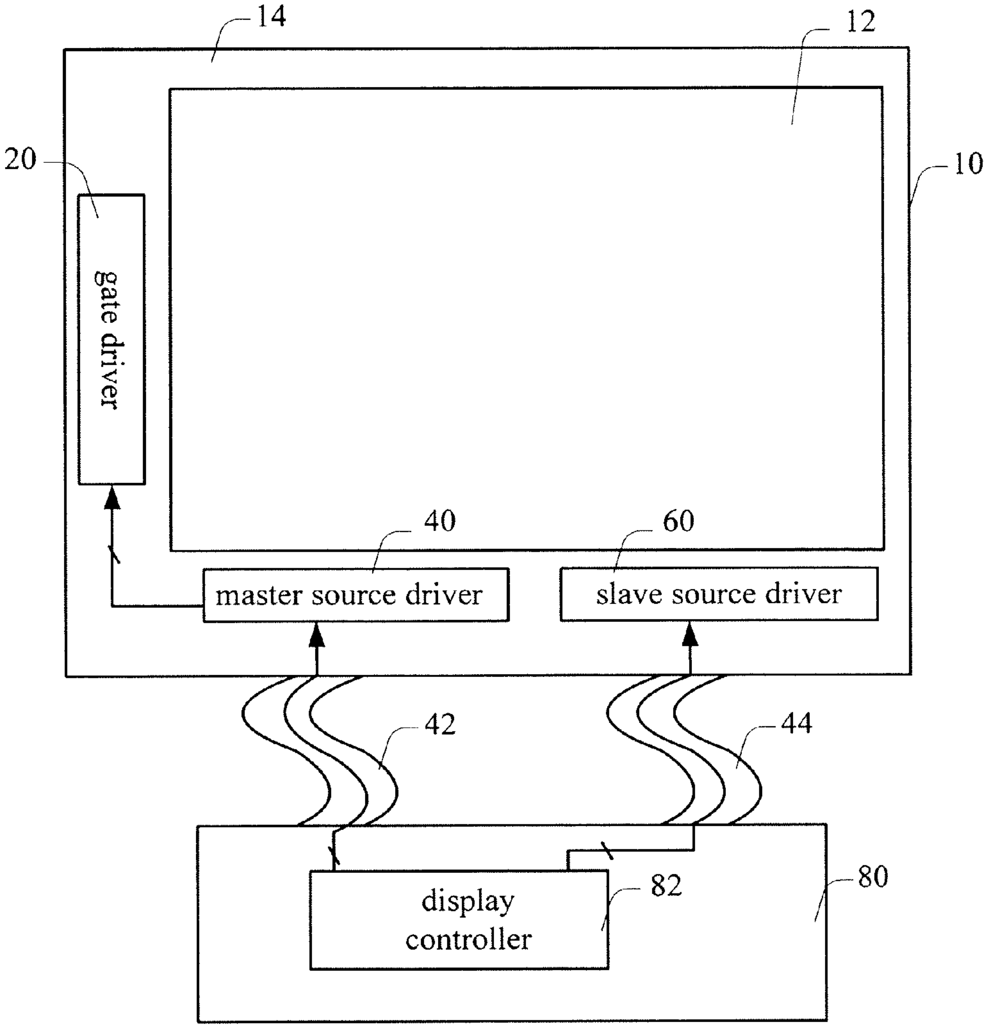
FIG. 1 (Prior Art)
FIG. 1 is a schematic diagram of a LCD panel and a driving circuit thereof according to the prior art.
Figure 2:
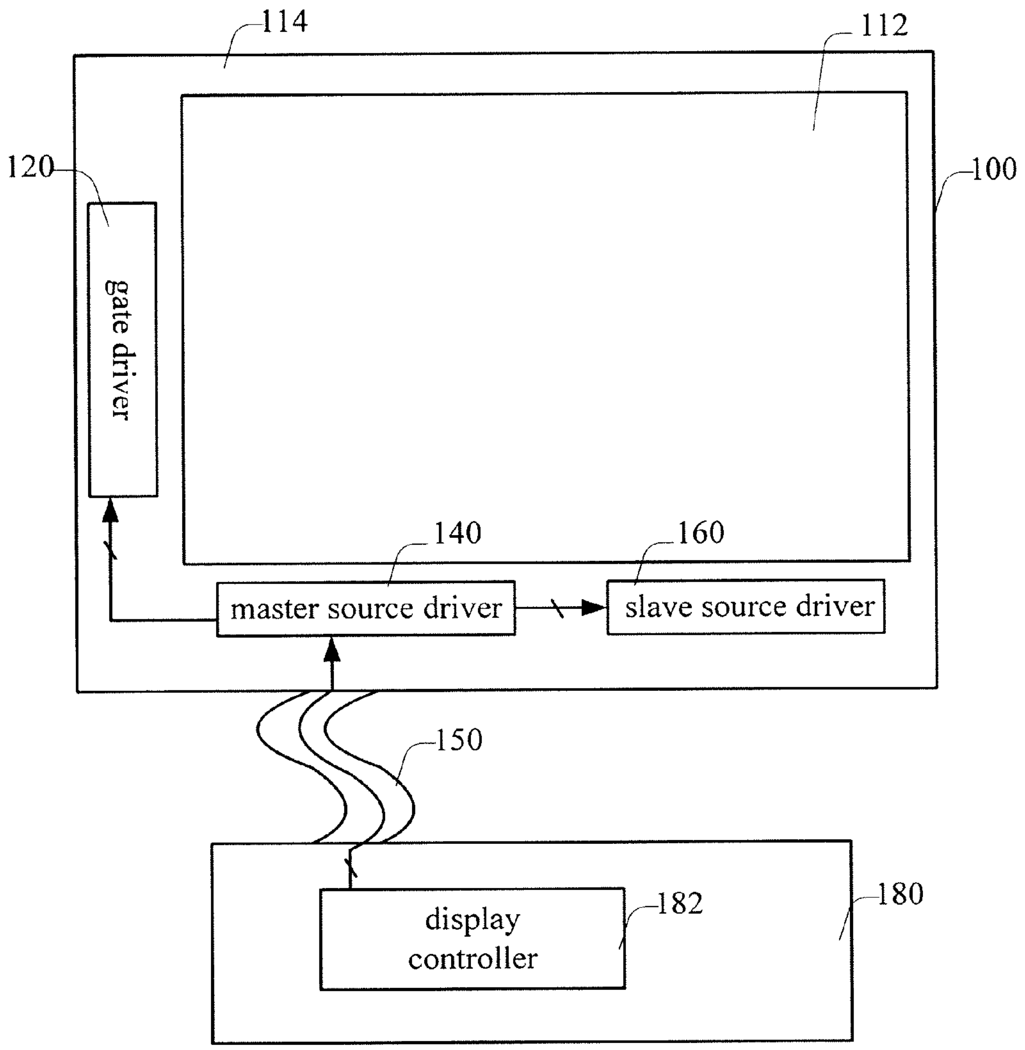
FIG. 2 is a schematic diagram of an LCD panel and a driving circuit thereof in accordance with an embodiment of the present invention.

FIG. 2 shows a schematic diagram of an LCD panel and a driving circuit thereof in accordance with an embodiment of the present invention. An LCD panel 100 comprises a display area 112 and a non-display area 114. The display area 112 comprises a TFT array; and the non-display area 114 comprises a gate driver 120, a main source driver 140 and a slave source driver 160 for driving transistors of the TFT array.

A display controller 182 on a circuit board 180 utilizes an FPC 150 to transmit a digital image signal to the main source driver 140, which generates a slave source driving signal and a gate driving signal to the slave source driver 160 and the gate driver 120, respectively. The digital image signal, the gate driving signal and the slave source driving signal are of TTL or CMOS logic level. Since the cost and area of the FPC 150 are proportional to each other, the FPC 150 for transmitting the digital image signal reduces cost while improving signal quality. Detailed description on the FPC 150 is disclosed below.

Since the gate driving signal and the slave source driving signal are of TTL or CMOS logic level with frequencies about tens of MHz, a fast high-low transition may cause serious EMI. In order to solve the foregoing problem, a shielding metal covering traces between the slave source driving signal and the gate driving signal on the LCD panel is applied for reducing EMI.

Preferably, the TTL or CMOS logic level signals, i.e., the gate driving signal and the slave source driving signal, are converted to signals with a low swing voltage and slow transition speed, so as to reduce EMI without the shielding metal.

Figure 3:
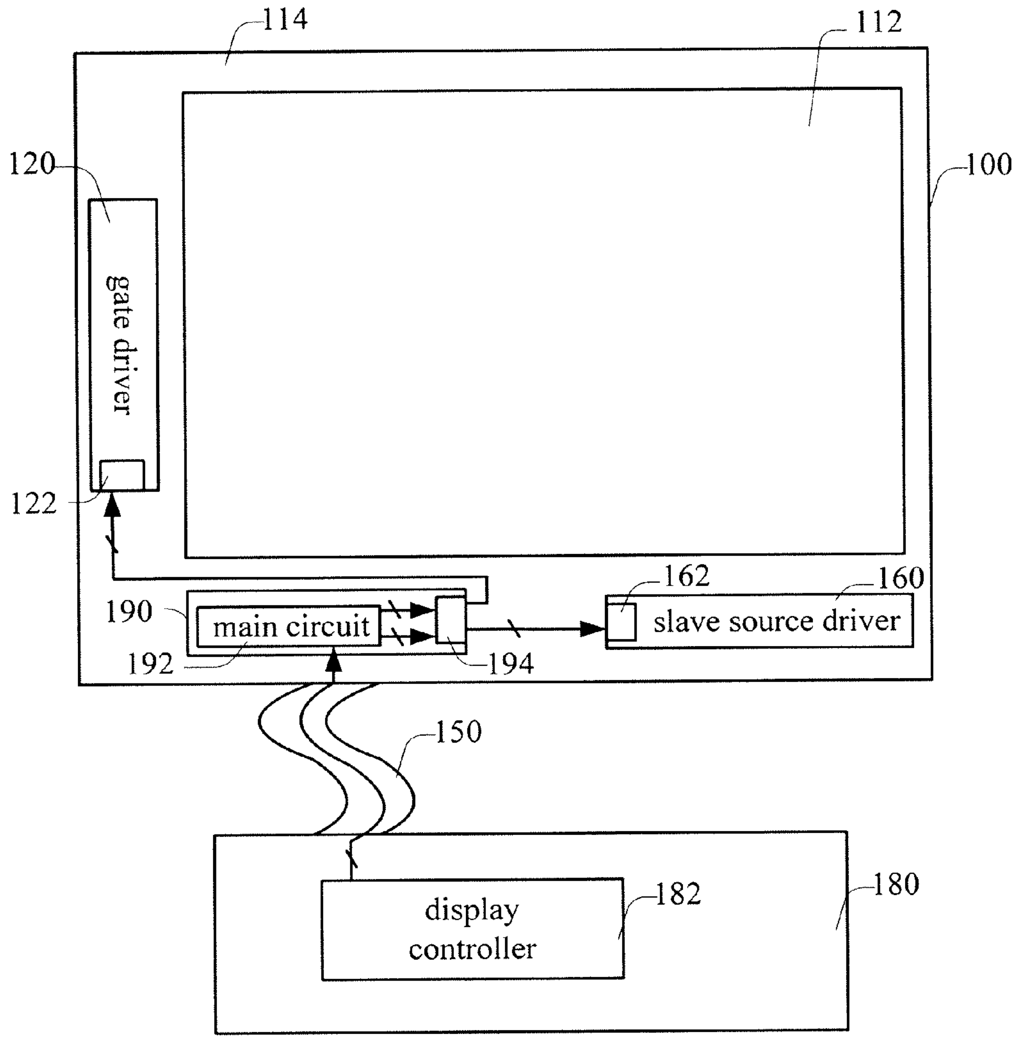
FIG. 3 is a schematic diagram of an LCD panel and a driving circuit thereof in accordance with another embodiment of the present invention.

FIG. 3 shows a schematic diagram of an LCD panel and a driving circuit thereof in accordance with another embodiment of the present invention. A master source driver 190 comprises a main circuit 192 and a conversion output unit 194. The main circuit 192 mainly operates in the identical way as the master source driver 140 illustrated in FIG. 2. The main circuit 192 receives the digital image signal outputted by the display controller 182 and outputs a slave source driving signal and a gate driving signal of TTL or CMOS logic level to the conversion output unit 194.

The conversion output unit 194 receives and converts the slave source driving signal and the gate driving signal of TTL or CMOS logic level to signals with a low swing voltage and slow transition speed. The gate driver 120 and the slave source driver 160, respectively comprising conversion input units 122 and 162, convert the received signals with the low swing voltage and slow transition speed to a gate driving signal and a slave source driving signal of TTL or CMOS logic level. Therefore, signals transmitted on the LCD panel are the gate driving signal and the slave source driving signal with low swing voltages and slow transition speed. Therefore, according to this embodiment of the present invention, not only is shielding metal spared but EMI is also effectively reduced.

Figure 4A:
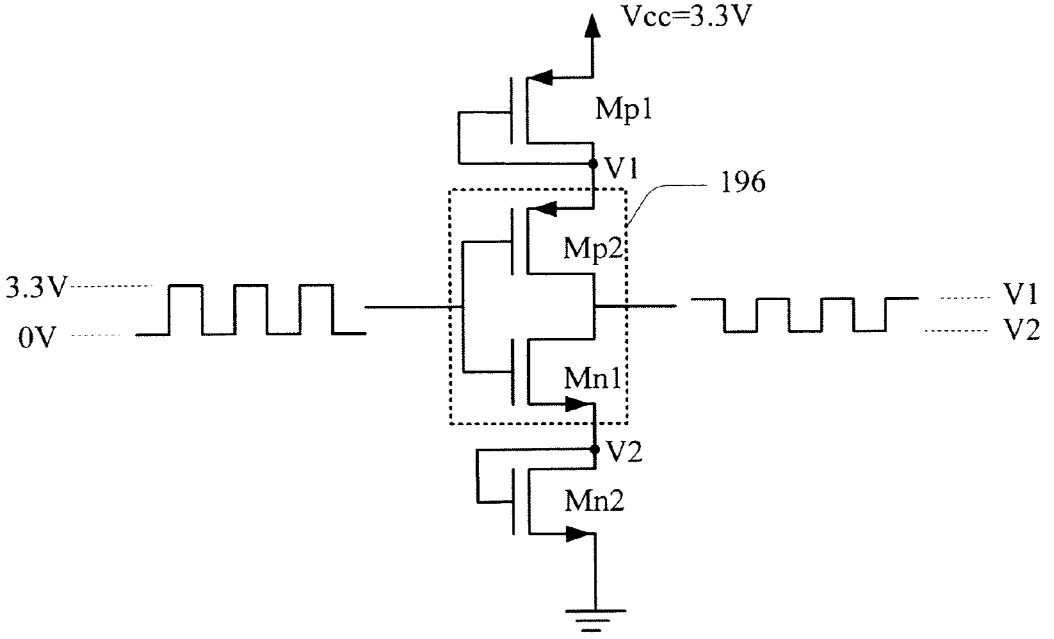
FIG. 4A is a schematic diagram of a conversion output unit in accordance with an embodiment of the present invention.

FIG. 4A shows a conversion output unit in accordance with an embodiment of the present invention. The conversion output unit comprises a first PMOS transistor Mp1, a second PMOS transistor Mp2, a first NMOS transistor Mn1 and a second NMOS transistor Mn2. For example, the first PMOS transistor Mp1 has its source connected to a 3.3V voltage source, and its gate connected to its drain to form a diode connected transistor. The second NMOS transistor Mn2 has its source connected to ground, and its gate connected to its drain to form a diode connected transistor.

The second PMOS transistor Mp2 and the first NMOS transistor Mn1 form a buffer 196. The second PMOS transistor Mp2 has its drain connected to the drain of the first PMOS transistor Mp1, and the first NMOS transistor Mn1 has its gate connected to the gate of the second PMOS transistor Mp2 to form an input end of a buffer 196. The second PMOS transistor Mp2 has its drain connected to the drain of the first NMOS transistor Mn1 to form an output end of the buffer 196, and the first NMOS transistor Mn1 has its source connected to the drain of the second NMOS transistor Mn2.

Referring to FIG. 4A, the first PMOS transistor Mp1 and the second NMOS transistor Mn2 are configured as diode connected transistors. Suppose that a drain voltage of the first PMOS transistor Mp1 is V1 and a drain voltage of the second NMOS transistor Mn2 is V2, where Vcc>V1>V2>0. Therefore, a conversion output unit illustrated in FIG. 4A reduces the voltage swing from 3.3V to a difference by subtracting V2 from V1.

Figure 4B:
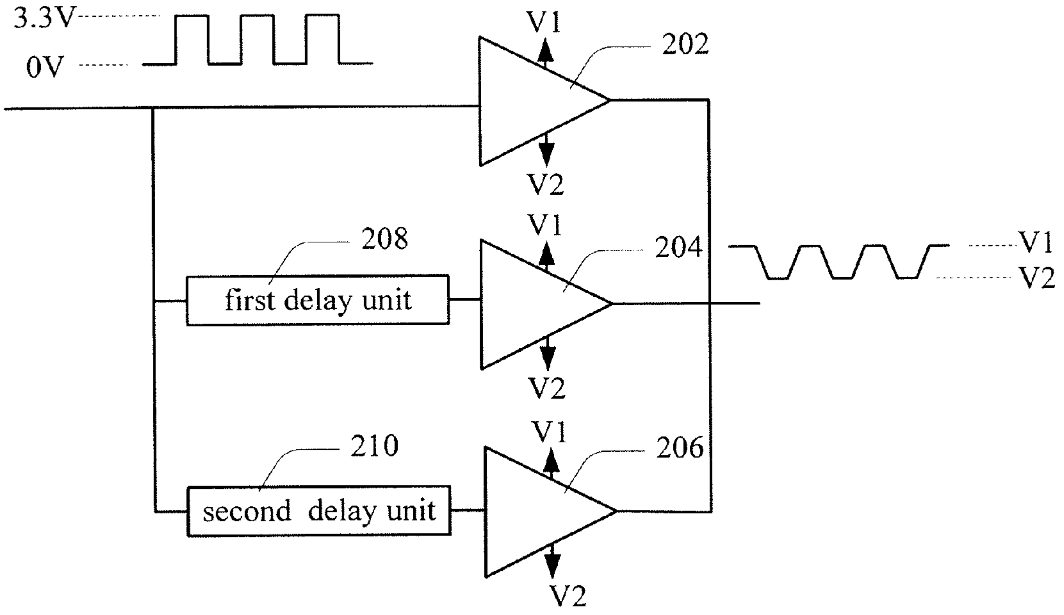
FIG. 4B is a schematic diagram of a conversion output unit in accordance with another embodiment of the present invention.

Referring to FIG. 4B showing a schematic diagram of a conversion output unit in accordance with another embodiment of the present invention. The conversion output unit comprises a first buffer 202, a second buffer 204, a third buffer 206, a first delay unit 208 and a second delay unit 210. The first buffer 202, the second buffer 204 and the third buffer 206, being identical to the buffer 196 illustrated in FIG. 4A, are connected to voltage sources V1 and V2. The first delay unit 208 and the second delay unit 210 have different delay time.

A signal input end is directly connected to an input end of the first buffer 202. The signal input end is connected to an input end of the first delay unit 208, of which an output end is connected to an input end of the second buffer 204. The signal input end is also connected to an input end of the second delay unit 210, of which an output end is connected to an input end of the third buffer 206.

In this embodiment, in addition to reducing a swing voltage from 3.3V to V1-V2, the conversion output unit illustrated in FIG. 4B further reduces a first transition slope to a second transition slope.

Figure 5:
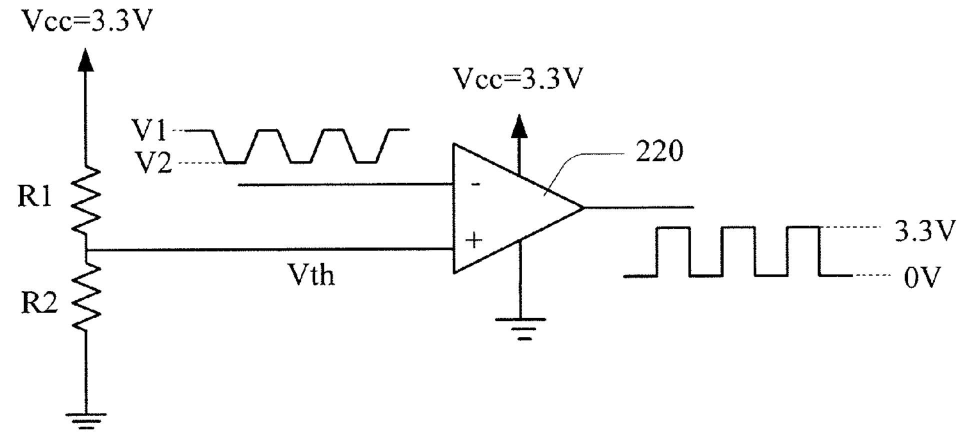
FIG. 5 is a schematic diagram of a conversion input unit in accordance with an embodiment of the present invention.

FIG. 5 shows a schematic diagram of a conversion input unit in accordance with an embodiment of the present invention. The conversion input unit comprises a comparator 220, a first resistor R1 and a second resistor R2. The first resistor R1 and the second resistor R2 are serially connected between a 3.3V voltage source and the ground to form a voltage dividing circuit for providing a threshold voltage Vth to a positive input end of the comparator 220. A signal input end is connected to a negative input end of the comparator 220. In this embodiment, in addition to increasing a voltage swing from V1-V2 to 3.3V, the conversion input unit also increases a second transition slope to a first transition slope.

Figure 6:
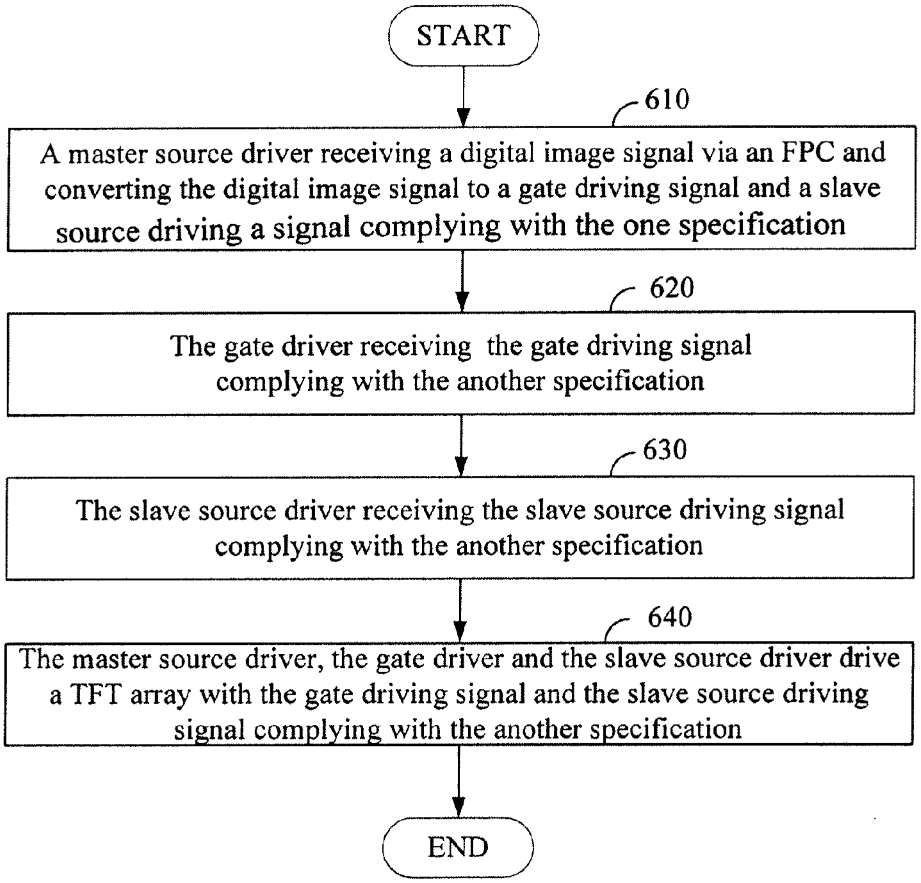
FIG. 6 (PRIOR ART)
FIG. 6 is a flow chart of a method for transmitting an LCD driving signal with low EMI in accordance with an embodiment of the present invention.

FIG. 6 shows a flow chart of a method for transmitting an LCD driving signal with low EMI in accordance with an embodiment of the present invention. In Step 610, a master source driver receives a digital image signal via an FPC and converts the digital image signal to a gate driving signal and a slave source driving signal, which are compliant with another specification such as a High-Speed Transceiver Logic (HSTL) specification or a Stub Series Terminated Logic (SSTL) specification. For example, the digital image signal is compliant with a low voltage differential signal (LVDS) specification. The swing voltage and the transition speed of the gate driving signal and the slave source driving signal, compliant with the another specification, is smaller than those of signals compliant with a TTL or CMOS logic specification. It should be noted that, the swing voltage and the transition speed of the gate driving signal and the slave source driving signal compliant with the another specification are adjustable. In Step 620, a gate driver receives and converts the gate driving signal in compliance with the another specification to the gate driving signal in compliance with TTL or CMOS logic specification. The gate driving signal in compliance with TTL or CMOS logic specification swings between a first level and a second level, and the gate driving signal of the another specification swings between a third level and a fourth level. Preferably, the first level is greater than the third level, the third level is greater than the fourth level, and the fourth level is greater than the second level. In Step 630, the slave source driver receives and converts the slave source driving signal in compliance with the another specification to the slave source driving signal in compliance with TTL or CMOS logic specification. In Step 640, the master source driver, the gate driver and the slave source driver drive a TFT array on an LCD panel with the gate driving signal and the slave source driving signal in compliance with the another specification, respectively.

To sum up, the present invention provides a driving circuit on an LCD panel, with a signal transmitted on the LCD panel having a low swing voltage and adjustable slow high-low transition, such that EMI of the LCD panel is significantly reduced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display (LCD) panel, coupled to a display controller, the LCD panel comprising:

a master source driver, for receiving a digital image signal in compliance with a first electrical specification from the display controller and converting the digital image signal to a gate driving signal and a slave source driving signal in compliance with a second electrical specification;

a gate driver, for receiving the gate driving signal in compliance with the second electrical specification; and a slave source driver, for receiving the slave source driving signal in compliance with the second electrical specification, wherein, the master source driver, the slave source driver and the gate driver drive a thin-film transistor (TFT) array on the LCD panel according to the digital image signal, the slave source driving signal and the gate driving signal, respectively, wherein the master source driver comprises a main circuit and a conversion output unit, wherein the conversion output unit receives an output from the main circuit, and the conversion output unit comprises a plurality of buffers and at least one delay unit to adjust a transition slope of the output from the main circuit and produce the gate driving signal and the slave driving signal, wherein the first electrical specification is a transistor-transistor logic (TTL) specification or a complementary metal-oxide-semiconductor (CMOS) logic specification, wherein the main circuit is configured for receiving the digital image signal in compliance with the TTL specification or the CMOS logic specification and converting the digital image signal to another gate driving signal and another slave source driving signal in compliance with the TTL specification or the CMOS logic specification, wherein the conversion output unit is configured for receiving said another gate driving signal and said another slave source driving signal in compliance with the TTL specification or the CMOS logic specification, and converting said another gate driving signal and said another slave source driving signal to the gate driving signal and the slave source driving signal in compliance with the second electrical specification, wherein the conversion output unit comprises:

a first buffer;

a first delay unit;

a second buffer, with an input end connected to an output end of the first delay unit;

a second delay unit;

a third buffer, with an input end connected to an output end of the second delay unit; and wherein the gate driving signal in compliance with the TTL specification or the CMOS logic specification is received at an input end of the first buffer, an input end of the first delay unit and an input end of the second delay unit, and the gate driving signal in compliance with the second electrical specification is outputted at an output end of the first buffer, the output end of the second buffer and the output end of the third buffer.

2. The LCD panel as claimed in claim 1, wherein a swing voltage and a transition speed of the gate driving signal and the slave source driving signal, in compliance with the second electrical specification, are smaller than those of signals in compliance with the TTL specification or the CMOS logic specifitcation.

3. The LCD panel as claimed in claim 1, wherein the second electronic specification is a High-Speed Transceiver Logic (HSTL) specification or a Stub Series Terminated Logic (SSTL) specification.

4. The LCD panel as claimed in claim 1, wherein the gate driver further comprises a conversion input unit for receiving and converting the gate driving signal in compliance with the second electric specification to another gate driving signal in compliance with the TTL specification or the CMOS logic specification.

5. The LCD panel as claimed in claim 1, wherein the plurality of buffers are configured for receiving and converting said another gate driving signal in compliance with the TTL specification or the CMOS logic specification to the gate driving signal in compliance with the second electrical specification; and wherein the gate driving signal in compliance with the TTL specification or the CMOS logic specification swings between a first level and a second level, the gate driving signal in compliance with the second electrical specification swings between a third level and a fourth level, the first level is greater than the third level, the third level is greater than the fourth level, and the fourth level is greater than the second level.

6. The LCD panel as claimed in claim 1, wherein the gate driving signal in compliance with the TTL specification or the CMOS logic specification swings between a first level and a second level, the gate driving signal in compliance with the second electrical specification swings between a third level and a fourth level, the first level is greater than the third level, the third level is greater than the fourth level, and the fourth level is greater than the second level.

7. The LCD panel as claimed in claim 1, wherein the slave source driver comprises a conversion input unit for receiving and converting the slave source driving signal in compliance with the second electrical specification to another slave source driving signal in compliance with the TTL specification or the CMOS logic specification.

8. The LCD panel as claimed in claim 7, wherein the conversion input unit comprises:

a comparator, with a first end for receiving a reference voltage, a second end for receiving the slave source driving signal in compliance with the second electrical specification and an output end for outputting said another slave source driving signal in compliance with the TTL or the CMOS logic specification.

9. The LCD panel as claimed in claim 8, wherein said another slave source driving signal in compliance with the TTL specification or the CMOS logic specification swings between a first level and a second level, the slave source driving signal in compliance with the second electrical specification swings between a third level and a fourth level, the first level is greater than the third level, the third level is greater than the fourth level, and the fourth level is greater than the second level.

10. The LCD panel as claimed in claim 1, wherein the master source driver receives the digital image signal in compliance with the first electrical specification via a flexible printed circuit (FPC).

* * * * *